June 2, 1925.
E. P. ROBERTS
1,539,868
CHART
Filed Oct. 30, 1922
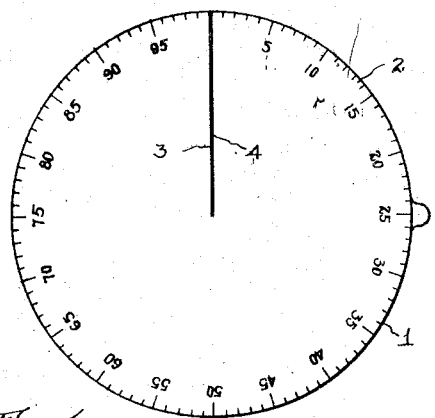
Fig.1.
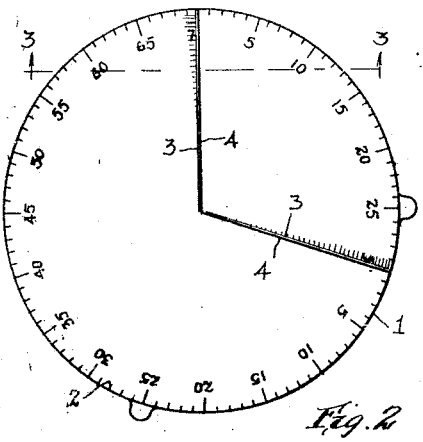
Fig.2.
Fig.3.
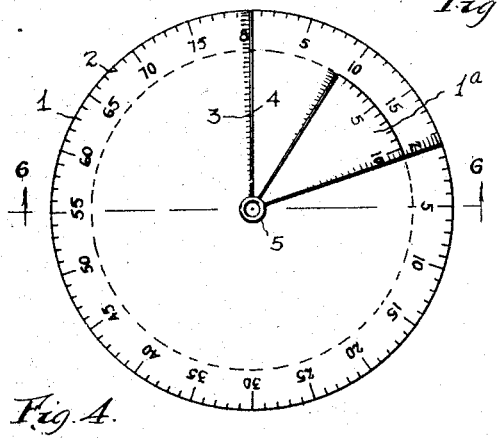
Fig.4.
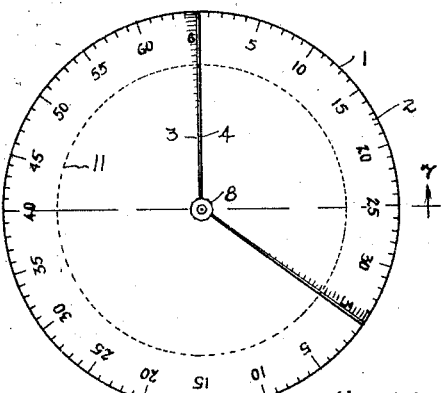
Fig.5.
Fig.6.
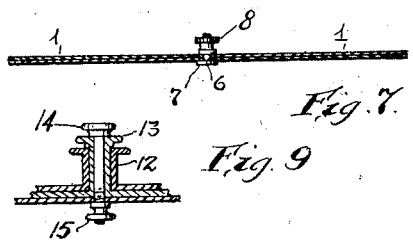
Fig.7.
Fig.9
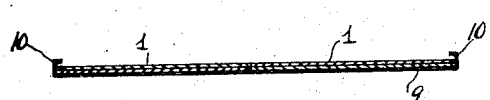
Fig.8.
INVENTOR.
Edward P. Roberts
BY
Pay, Oberlin & Pay
ATTORNEYS Patented June 2, 1925.

1,539,868

UNITED STATES PATENT OFFICE.

EDWARD P. ROBERTS, OF LAKEWOOD, OHIO.

CHART.

Application filed October 30, 1922. Serial No. 597,915.

*To all whom it may concern:*

Be it known that I, EDWARD P. ROBERTS, a citizen of the United States, and a resident of Lakewood, county of Cuyahoga, and State of Ohio, have invented a new and useful Improvement in Charts, of which the following is a specification, the principle of the invention being herein explained and the best mode in which I have contemplated applying that principle, so as to distinguish it from other inventions.

The present improvements, relating, as indicated, to charts, have more particular regard to so-called "pie" charts such as are familiarly employed to illustrate statistical summaries of various kinds. Ordinarily such chart requires to be specially drawn or laid out in each case, the relative numbers or quantities composing the whole of the subject-matter investigated, or sought to be portrayed, being represented by dividing up a circular figure into segments of different colors or otherwise distinguished from each other.

The object of the present invention is to provide a simple device whereby such charts may be readily assembled in order thus to represent in the form of segments of a circle the components of any given unit, whether of population, factory output or budget of expenses. The device is adapted for use over and over again, or if made in sufficiently inexpensive form, the resultant charts may be preserved in the form assembled as a permanent record. The device is furthermore adaptable for use in making up charts of the type in question where these are to be reproduced in printed form for when assembled the chart may be photographically copied and a cut made therefrom much more readily than a similar chart can be drawn.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a plan view of one of the component elements of my device; Fig. 2 is a similar view of such device in assembled form where composed of two such elements; Fig. 3 is a transverse section of such assembled device, the plane of the section being indicated by the line 3—3, Fig. 2; Fig. 4 is a view of a slightly modified form of the assembled device; Fig. 5 is a view, similar to Fig. 4, but showing still another modified form; Fig. 6 is a diametral section of the form of device shown in Fig. 4; Fig. 7 is a similar section of the form of device shown in Fig. 5; Fig. 8 is a diametral section of still a further modified form of the device; and Fig. 9 is a broken diametral section of yet another modified construction.

The main element of the device is a disk 1, preferably of the circular form shown in Fig. 1, with a scale 2 about its periphery, such scale being graduated in percentages or according to other basis of sub-division, e. g. degrees, as may be desired. The element is formed with a slit 3 extending radially from its center, or a point approximately at its center, to its periphery at the point thereon corresponding with the zero point on such scale. Such element 1 may consist simply of sheets of paper or light cardboard with the scale and other desired data printed thereon, or it may be made of celluloid or sheet metal or any other suitable material. The size of the element, moreover, may be varied to suit the use to which the device is to be put, i. e. whether intended for the desk or for the purpose of exhibition.

Whatever the material of the element, the color thereof may vary in the case of successive elements employed in assembling the device, as will be presently explained, or where such successive elements are all of the same color, e. g. white sheets of paper, a line 4 of black or other color will be placed closely adjacent that edge of the slit 3 lying on the side thereof at which the scale 2 starts, and such line may be advantageously added in any case.

The assembled device comprises a plurality of the disk-like elements 1, two of the latter being shown, for example, in Fig. 2. In order to assemble the elements, they are placed one on top of the other with the slits 3 in alignment and thereupon are rotated relatively to each other, so that the left hand edge of the slit of each of the upper disks will pass underneath the right hand edge of the lowermost disk. The upper disks may then be rotated to leave uncovered any desired fractional part of the next lower disk, such uncovered parts being in the form of segments, the circular measure of which is indicated by the scale, while such segments are readily distinguishable one from the other either by the radial markings 4 or by the different colors of the successive disks where the latter method is employed for the purpose of distinguishing between said disks or by both means.

After the disks have been relatively adjusted into desired position, they may be permanently secured together in any suitable way as by being glued one to the other or by passing therethrough any familiar form of fastener, and the quantity which each exposed segmental portion of the successive disks is intended to represent may be inscribed or printed thereon, or indicated by tabs or tickets (not shown). If desired, moreover, the disks composing any particular device may be more or less permanently secured together and still left free to be rotated by means of an eyelet 5 that is passed through suitable openings 6 at the centers of the disks, as shown in Figs. 4 and 6; or a threaded stud 7 may be similarly passed through such openings 6 and the disks secured thereon by means of a nut 8, as shown in Figs. 5 and 7. Instead of being thus centrally fastened together, the assembled disks may be placed in a shallow circular container 9, as shown in Fig. 8, such container being formed with a peripheral flange 10 that may be bent down upon the topmost disk, or the disks may be simply allowed to rest rotatably free in such container.

In Fig. 4 I show a further modification consisting in the use of one or more disks 1ª, similar to the disks 1, except for the fact that they are of smaller diameter. By the use of such disks 1ª, sub-divisions within the divisions of the larger disks left uncovered may be indicated, as will be readily apparent. A further modification is likewise illustrated in Fig. 5 in that a circular line or band 11 is imprinted or otherwise formed on the disks at the same distance from the center in each case, such circle or band serving to assist in concentrically assembling the disks, while it may also be used for the purpose of marking off sub-divisions within the respective uncovered portions of the several disks.

Finally, in Fig. 9 I show a method of mounting the disks in more permanent fashion, as may be desirable where the device is intended for repeated use as for exhibition or demonstration purposes. Here the several disks are provided with central openings as in Figs. 4 and 5, but in addition a tubular stem or thimble 12 is fixedly secured to the disk surrounding such opening therein, these stems being of different heights and formed at their upper ends with buttons 13 whereby any selected stem and the corresponding disk may be more readily rotated about their common axis. In order to hold the disks together, a threaded pin 14 with nut 15 may be passed through the innermost stem 12 and the disks thus prevented from becoming separated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. An adjustable sector type chart comprising a plurality of disks, each formed with a single radial slit and said disks being directly rotatably fitted together and mutually supported independently of any interposed part by having a segmental portion of each disk extending through the slit in the adjacent disk so as to leave complementary segmental portions of successive disks exposed.

2. An adjustable sector type chart comprising a plurality of substantially circular disks, each having a scale extending about its periphery and being formed with a radial slit, and said disk being directly rotatably fitted together and mutually supported independently of any interposed part by having a segmental portion of each disk extending through the slit in the adjacent disk so as to leave complementary segmental portions of successive disks exposed, each disk further having a distinguishing radial line closely adjacent that edge of the slit therein at which the scale thereon begins.

3. An adjustable sector type chart comprising a plurality of disks, each formed with a radial slit and said disks being directly rotatably fitted together and mutually supported independently of any interposed part by having a segmental portion of each disk extending through the slit in the adjacent disk so as to leave complementary segmental portions of successive disks exposed, certain of said disks being of lesser diameter than the other or others.

4. An adjustable sector type chart comprising a plurality of disks, each formed with a radial slit, and said disks, being directly rotatably fitted together and mutually supported independently of any interposed part by having a segmental portion of each disk extending through the slit in the adjacent disk so as to leave complementary segmental portions of successive disks exposed, said disks furthermore having central openings wherewith the slits thereof intersect, and securing means passing through such openings.

5. An adjustable sector type chart comprising a plurality of disks, each formed with a single radial slit, and said disks being directly rotatably fitted together and mutually supported independently of any interposed part by having a segmental portion of each disk extending through the slit in the adjacent disk so as to leave complementary segmental portions of successive disks exposed, said disks furthermore having central openings wherewith the slits thereof intersect, and securing means passing through such openings, such means being adapted to clamp said disks together in any desired angular relation to each other.

Signed by me, this 27th day of October, 1922.

EDWARD P. ROBERTS.